Figure 1:
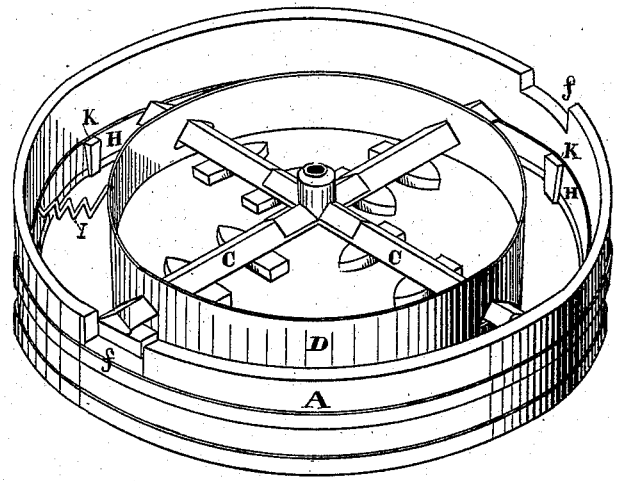
Figure 2:
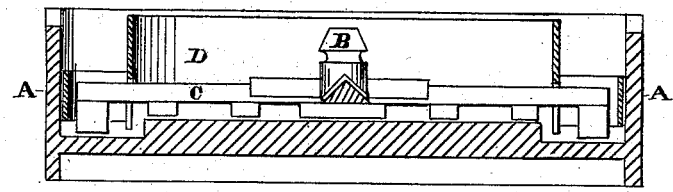

A. B. PAUL.
PAN-AMALGAMATOR.

No. 193,030. Patented July 10, 1877.

Witnesses
Geo. H. Strong
Olwyn T. Stacy

Inventor
A. B. Paul
By his atty's
Dewey & Co

UNITED STATES PATENT OFFICE.

ALMARIN B. PAUL, OF SAN FRANCISCO, CALIFORNIA.

IMPROVEMENT IN PAN AMALGAMATORS.

Specification forming part of Letters Patent No. 193,030, dated July 10, 1877; application filed December 2, 1876.

*To all whom it may concern:*

Be it known that I, ALMARIN B. PAUL, of the city and county of San Francisco and State of California, have invented an Improved Double-Deck Settler and Pan; and I do hereby declare the following to be a full, clear, and exact description thereof, reference being had to the accompanying drawings.

My improvement consists in providing a pan or settler with a skeleton muller, and securing upon said muller a vertical rim, which is concentric with the rim of the pan, so that two compartments will be formed inside of one pan, the outer compartment being annular in form. The bottom of the pan or settler is so constructed that the portion which forms the bottom of the inside compartment is several inches higher than the bottom of the outside or annular compartment. The annular track or compartment outside of the rim which is attached to the muller will then form a separate compartment of greater depth than the inner compartment, and, if desired, its floor may be constructed with an incline or pitch toward the outside rim or periphery of the pan. The muller is provided with shoes both inside and outside of the inner rim. The pan is so constructed that an electric current can be established in the pan by making the proper connections.

My invention is fully described in the following description, reference being had thereto in the accompanying drawings.

This pan A can be made entirely of iron, or the bottom can be made of wood or artificial stone, and the rim or side of wood or iron. When the pan is worked electrically the rim or side will be made of wood. B is the conical boss or muller-saddle in the center of the pan, which receives the shafting and gear as ordinarily used, and which rotates the muller. The muller C is long enough to cover the bottom of the inner and outer part of the pan. D is a circular vertical rim, which rests upon the muller C, and is so constructed as to fit the same and yet reach one or more inches below the outer edge of the inner bottom. The inner rim should be two or more inches above the highest point of the outer discharge of the pan. The muller, both in the inner and outer parts, is provided with suitable ordinary shoes for working and moving the pulp within.

The pulp is introduced into the inside or center compartment, and gradually works itself below the muller and into the annular outside compartment or settler portion of the pan. This outside compartment I supply with clear water, the quantity supplied being about twice as much as is introduced into the inside compartment with the pulp. In the outside rim of the pan I make two or more holes, $f f$, through which the light portion of the pulp is discharged as it rises. I prefer to make several openings at different heights from the bottom of the pan, so that the water and débris may be discharged at any point according to its gravity by removing the proper plug. These discharge-openings must be made large enough to discharge the materials with equal rapidity to that with which the water is introduced into both parts of the pan or settler, and so that the outside body of water may not overcome the discharge from the inner to the outer compartment.

It will be observed that in consequence of the extra amount of water going into the outer part of the vessel, the material will have at least one-half the density of that in the inner portion of the pan, and it can be made of still less density, if desired. By this arrangement all metallic substances which would not precipitate in the inner part of the vessel can be readily precipitated in the outer compartment and still not prevent the flow of the silicious or earthy matter. By a device which is attached to this pan or settler, but not a part of this patent, all the amalgamated metal or mercury is drawn off as soon as precipitated. The inner rim is intended to be made of any metallic substances, and of weight sufficient to rest solidly on the muller, being at the same time properly secured, so as not to readily move or change its positions when once set.

When the pan is used as an electric settler this inner rim should be made of iron, so as to provide a negative to the copper, which latter should go inside of the outer rim, and should rest upon glass or other non-conducting substances, and of sufficient height above the floor to be free of water or any attractive object. The outside rim should be wood placed perpendicularly. A strip or sheet of heavy silver-plated or mercurialized copper, H, of a width sufficient to give, say, a four inch space between the iron bottom and edge of the copper, and be an inch or two below the upper edge of the wooden side, is secured to the inside of the pan, closely connecting and extending entirely around it.

Electric connection is made by supplying a spring-wire, I, one end being attached to the copper plate, and the other end arranged so as to bear upon the rotating rim. This connection must be at all times kept above the water to allow the current to pass through the same.

On the surface of the copper rim at stated distances should be placed slats of wood K, say, one-half inch, more or less, square for the purpose of checking the current of water, which otherwise would travel with the inner circle as it is carried around, and also for the purpose of creating an eddy which causes a circular wash against the amalgamated surfaces of the copper, and cause it thereby to take up any of the finer portions of metal which the electric condition of the plates assist in attracting and holding.

Another advantage which is gained by this device is that separate chemicals, whether as an electric agent or not, can be used in different compartments, and caused to intermingle at pleasure. Also, cold water can be used in the inner circle and hot water in the outer, and vice versa. The muller can be made lighter or heavier, entirely of iron or in part wood, the latter being best.

In every instance the inner rim should rest so that nothing can pass without going entirely down near the bottom of the outside chambers. These pans or settlers can be made of any size— say six feet, more or less; but in no instance should the outside part be less than six inches in diameter.

Having thus described my invention, what I claim, and desire to secure by Letters Patent, is—

1. The pan A, having the outer and inner portion of its bottom at different levels, as shown, and provided with the muller C, operating in both parts, in combination with the annular rim D, supported upon the muller and reaching to near the bottom of the outer compartment, so as to allow a partial separation of the contents of the two compartments, and a gradual discharge from the inner to the outer one, substantially as herein described.

2. The copper or other electro-positive rim H, secured to the inside of the pan A, and connected with the electro-negative diaphragm D by the elastic wire I, substantially as herein described.

In witness whereof I have hereunto set my hand and seal.

ALMARIN B. PAUL. [L. S.]

Witnesses:
FRANK A. BROOKS,
OLWYN T. STACY.